United States Patent
Smith

(10) Patent No.: US 9,512,015 B2
(45) Date of Patent: Dec. 6, 2016

(54) METHOD AND SYSTEM FOR WATER TREATMENT

(71) Applicant: RED RIVER SERVICE CORPORATION, Dripping Springs, TX (US)

(72) Inventor: James A. Smith, Driftwood, TX (US)

(73) Assignee: RED RIVER SERVICE CORPORATION, Dripping Springs, TX (US)

( * ) Notice: Subject to any disclaimer, the term of this patent is extended or adjusted under 35 U.S.C. 154(b) by 165 days.

(21) Appl. No.: 14/494,176

(22) Filed: Sep. 23, 2014

(65) Prior Publication Data

US 2015/0197430 A1    Jul. 16, 2015

Related U.S. Application Data

(60) Provisional application No. 61/928,017, filed on Jan. 16, 2014.

(51) Int. Cl.
| | |
|---|---|
| *C02F 1/40* | (2006.01) |
| *B01D 17/02* | (2006.01) |
| *B01D 36/04* | (2006.01) |
| *B01D 17/00* | (2006.01) |
| *C02F 101/32* | (2006.01) |

(52) U.S. Cl.
CPC ............ *C02F 1/40* (2013.01); *B01D 17/0208* (2013.01); *B01D 17/0214* (2013.01); *B01D 17/085* (2013.01); *B01D 36/04* (2013.01); *C02F 2101/32* (2013.01)

(58) Field of Classification Search
CPC .. C02F 1/40; C02F 2101/32; B01D 17/0208; B01D 17/0214; B01D 36/003; B01D 36/04; E21B 43/34
USPC ........ 210/747.1, 747.9, 776, 170.01, 170.08, 210/265, 299, 540; 405/38, 43, 46, 53; 166/267, 75.12
See application file for complete search history.

(56) References Cited

U.S. PATENT DOCUMENTS

| | | | | |
|---|---|---|---|---|
| 3,325,008 A | * | 6/1967 | Lancy | C02F 11/16 210/265 |
| 3,606,731 A | * | 9/1971 | Cole | C02F 1/025 210/170.01 |
| 4,624,604 A | * | 11/1986 | Wagner | E02B 3/16 405/53 |
| 5,080,528 A | * | 1/1992 | Ressi di Cervio | E02B 3/16 405/38 |
| 5,132,021 A | * | 7/1992 | Alexander | E02D 31/004 210/170.08 |
| 5,513,928 A | * | 5/1996 | Eryou | E02D 31/00 210/170.01 |
| 6,758,982 B2 | * | 7/2004 | Poole | B01D 29/15 210/170.01 |
| 7,527,738 B2 | * | 5/2009 | Gonzalez | B32B 27/00 210/170.01 |
| 2013/0089376 A1 | * | 4/2013 | Nolt | B65G 5/00 405/53 |

* cited by examiner

*Primary Examiner* — Christopher Upton
(74) *Attorney, Agent, or Firm* — DuBois, Bryant & Campbell LLP; William D. Wiese

(57) ABSTRACT

Methods and systems for treating a hydrocarbon containing water waste mixture are taught and described. The mixture is placed into a composite-lined disposal cell wherein the liquid fraction separates into a water fraction and a hydrocarbon fraction. The hydrocarbon fraction is extracted and the water fraction is filtered through top soil and a geotextile composite into collector tubes located in the subgrade beneath the disposal cell. The filtered water is pumped into a first vessel and again allowed to separate into a hydrocarbon fraction and a water fraction. The hydrocarbon fraction is pumped into a second vessel and the water fraction may be extracted from the first vessel. The hydrocarbon in the second vessel may be further processed, treated, or sold to a reclaimer.

6 Claims, 6 Drawing Sheets

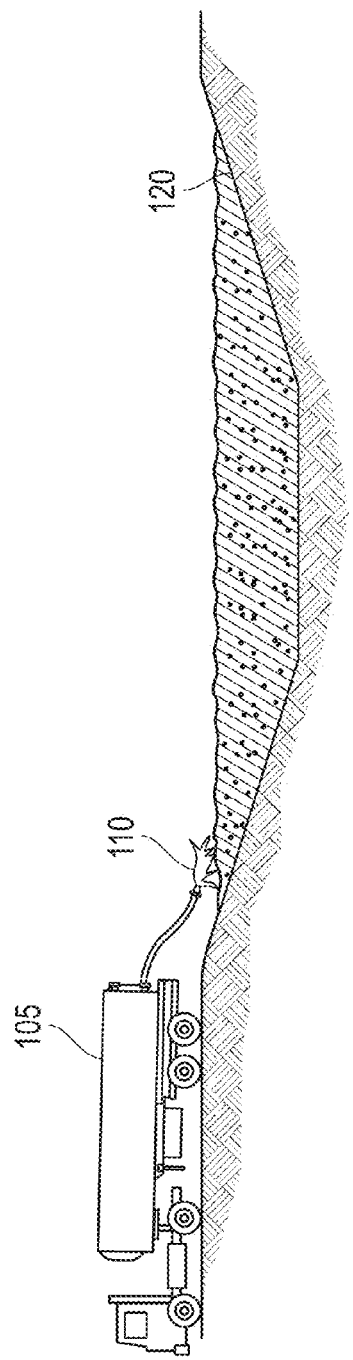
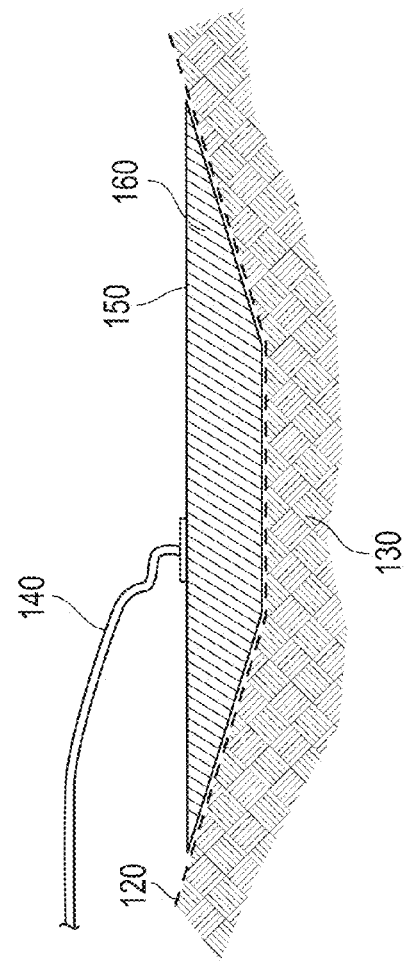
FIG. 1
FIG. 2

METHOD AND SYSTEM FOR WATER TREATMENT

PRIORITY STATEMENT UNDER 35 U.S.C. §119

The present U.S. Utility Patent Application claims priority pursuant to 35 U.S.C. §119(e) to U.S. Provisional Application Ser. No. 61/928,017, filed Jan. 16, 2014, entitled "Method and System for Water Treatment," naming James A. Smith as inventor, which is hereby incorporated herein by reference in its entirety and made part of the present U.S. Utility Patent Application for all purposes.

BACKGROUND OF THE INVENTION

This disclosure relates to devices, systems, and processes suitable for treating waste streams, and more particularly, for treating waste streams containing a mixture of hydrocarbons and water.

The disposal of hydrocarbon-containing waste streams can pose environmentally significant issues for a wide variety of industries. Water is frequently used at some point along the production process, either in cooling machinery, washing down equipment or playing a crucial part in the manufacturing process, problems occur when water picks up oil. This is particularly true in the oil industry in which the treatment of hydrocarbon containing wastewater generated from drilling oil wells is not only expensive, and increasingly becoming more so, but suitable disposal sites are also becoming scarce. Many techniques for extracting underground oil generate large volumes of a hydrocarbon/water waste mixture that requires treatment or disposal. The disposal of this waste mixture is complicated by the volume of waste generated through most extraction methods and the lack of locally available disposal sites.

There is a need, therefore, for an efficient and effective method and system for treating a hydrocarbon/water waste mixture on a large scale while being sensitive to the surrounding environment.

SUMMARY OF THE INVENTION

A system and method are described and claimed for the treatment of hydrocarbon waste product. A hydrocarbon containing water waste mixture is placed into a composite-lined disposal cell. The liquid fraction of the waste product is allowed to separate under quiescent conditions into a water fraction and a hydrocarbon fraction. The hydrocarbon fraction is extracted from the surface of the lined cell using a skimmer and low-volume pump known in the art. The water fraction is filtered through top soil and a geotextile composite into collector tubes located in the subgrade beneath the disposal cell. The filtered water is pumped into a first vessel and again allowed to separate into a hydrocarbon fraction above and a water fraction below. The hydrocarbon fraction is then pumped into a second vessel and the water fraction may be extracted from the first vessel. The hydrocarbon in the second vessel may be further processed, treated, or sold to a reclaimer. The water fraction in the first vessel, in turn, may be drained back into the cell and allowed to evaporate, either on its own or using enhanced evaporation techniques.

The foregoing has outlined rather broadly certain aspects of the present invention in order that the detailed description of the invention that follows may better be understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 1 depicts one embodiment of a disposal cell of the present invention;

FIG. 2 depicts skimming a hydrocarbon off the top of the contents in a disposal cell;

DETAILED DESCRIPTION OF THE INVENTION

Figure 3:
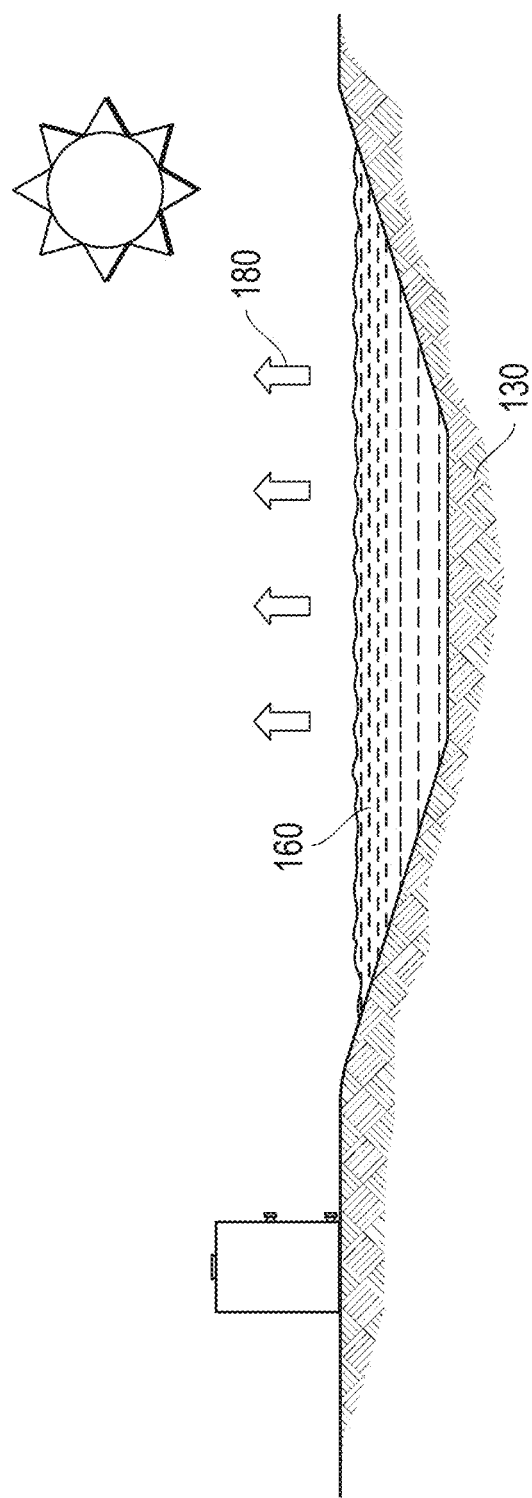
FIG. 3 depicts the aerobic oxidation and evaporation of water from a disposal cell.

The present invention is directed to improved methods and systems for, among other things, treating a hydrocarbon/water waste mixture. The configuration and use of the presently preferred embodiments are discussed in detail below. It should be appreciated, however, that the present invention provides many applicable inventive concepts that can be embodied in a wide variety of contexts other than the treatment of waste streams. Accordingly, the specific embodiments discussed are merely illustrative of specific ways to make and use the invention, and do not limit the scope of the invention. In addition, the following terms shall have the associated meaning when used herein:

"disposal cell" includes any cavity or vessel capable of holding a waste mixture;

"hydrocarbon" means liquid, wax or low-melting point solids consisting primarily of hydrogen and carbon including, without limitation, crude oil;

"subgrade" includes dirt, including either natural earth or fill dirt, in either a compacted or uncompacted form;

"vessel" includes and tank, container, truck, pit, or other apparatus for holding liquids; and "waste mixture" includes any liquid that includes a water fraction and a hydrocarbon fraction.

Referring now to FIG. 1, wherein a liquid hydrocarbon/water waste mixture 110 is unloaded into a composite-lined disposal cell 120. In many embodiments, the liquid mixture 110 is mostly wastewater from oilfield processing. The liquid mixture 110 generally does not include human sanitary wastewater, but may contain hazardous materials. The liquid mixture 110 may be transported to the disposal cell 120 by tanker 105 as shown in FIG. 1 or by other means known in the art.

In the disposal cell 120, the hydrocarbon and the water in the liquid mixture 110 separate. The relationship between oil and water in a mixture is governed by two physical properties: specific gravity (most hydrocarbons have a lower specific gravity than water and, without agitation, oil separates from the water according to Stokes' Law and floats to the surface) and surface tension (hydrocarbons typically bond more tightly to themselves and other materials than to water).

As shown in FIG. 2, the liquid fraction of the liquid mixture 110 is allowed to separate under quiescent conditions into a water fraction 160 and a hydrocarbon fraction 150, while the sediment 130 settles to the bottom of the cell 120. The time that the liquid mixture 110 remains in the cell 120 can vary, but in one embodiment with a cell 120 receiving fifteen daily shipments of 30 cubic meters each, the liquid mixture 110 would remain in the cell 120 approximately twenty days. In such a case, the hydraulic loading would remain below 0.045 cubic meters per square meter per day. The hydrocarbon 150 rises to the top and the water fraction 160 becomes a middle layer between the sediment 130 on the bottom and the hydrocarbon 150 on the top.

The hydrocarbon fraction 150 is extracted from the surface of the disposal cell 120 using a skimmer 140 and any of a variety of low-volume pumps known in the art. It may be desirable to place the skimmer 140 downwind to give it the benefit of the daytime winds that concentrate the hydrocarbon layer 150 on the downwind side of the cell 120.

With reference now to FIG. 3, once the hydrocarbon layer 150 has been removed, the cell 120 acts as an aerobic oxidation pond. By way of example, fifteen daily shipments of 30 cubic meters (approximately 8,000 gallons) may stay in the pond for an average of twenty days.

Figure 4:
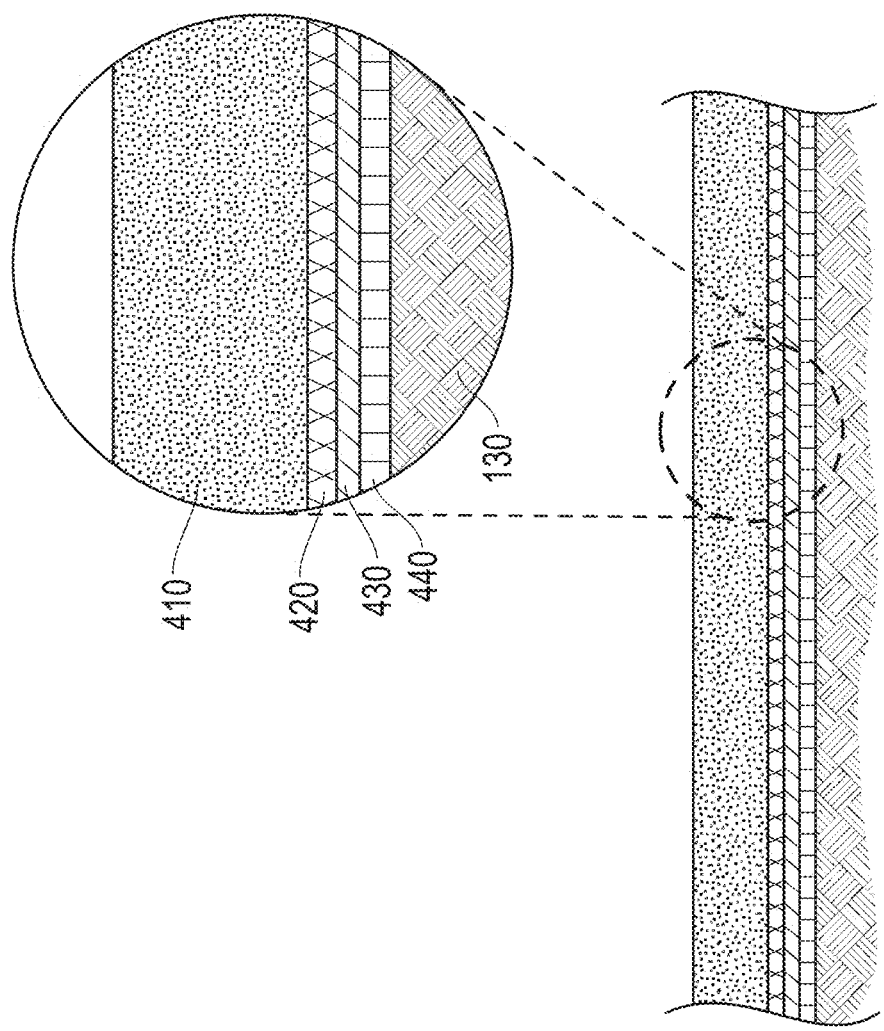
FIG. 4 is a cross sectional view of one embodiment of the liner under a disposal cell.

In one embodiments shown in FIG. 4, a layer of soil 410 is placed along the bottom of the cell. The soil 410 filters the water as it migrates downward. The thickness of the soil can vary considerably, but in one embodiment it is approximately two feet thick. A geotextile composite 420 is placed under the soil 410. The geotextile composite 420 can be any suitable blend of plastic and textile that allows the water to pass through while preventing passage of the soil 410. Beneath the geotextile composite 420 is a liner material 430, such as high density polyethylene, that is impermeable to water. The thickness of the liner material 430 can vary, but in some embodiments it is approximately 60 millimeters thick. The liner material 430 aids of retention of water in the geotextile composite 420 and prevents water from the cell from migrating into the groundwater. In some embodiments, a sealing layer 440 of a textile-wrapped bentonite, sometimes called "Bentoliner," which expands and seals against leakage when wetted under compression. This type of membrane is the equivalent of several feet of compacted clay and its function is to provide additional protection to groundwater. The sealing layer 440 rests on top of a prepared subgrade 130.

Figure 5:
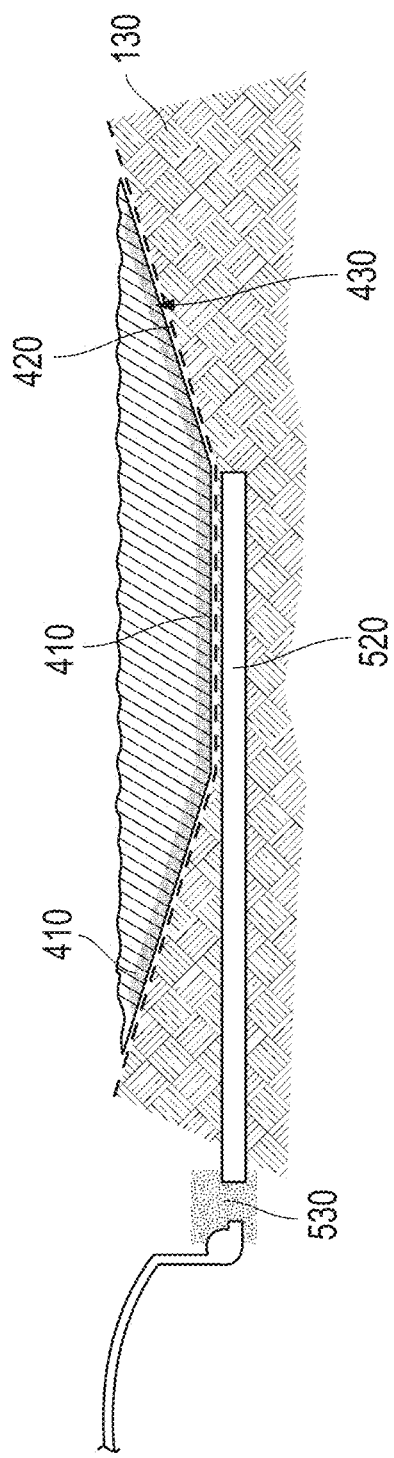
FIG. 5 is a cross-sectional depiction of one embodiment of a disposal cell of the present invention with topsoil over the liner.

Referring now to FIG. 5 which shows one embodiment of the present invention in which a layer of topsoil 410 is placed on top of the geotextile composite/liner material/sealing layer structure described above. The water in the geotextile composite 420 is channeled to openings or conduits in the geotextile composite through which the water can pass into collector tubes 520 located within the subgrade 130. The geomembrane liner material 430 allows the flow of water through the geotextile composite 420 to the collector tubes 520 while also keeping the topsoil 410 from entering the collector tubes 520. In some embodiments, the collector tubes 520 are then surrounded by another geotextile and rock to keep sediments out of the system.

Figure 6:
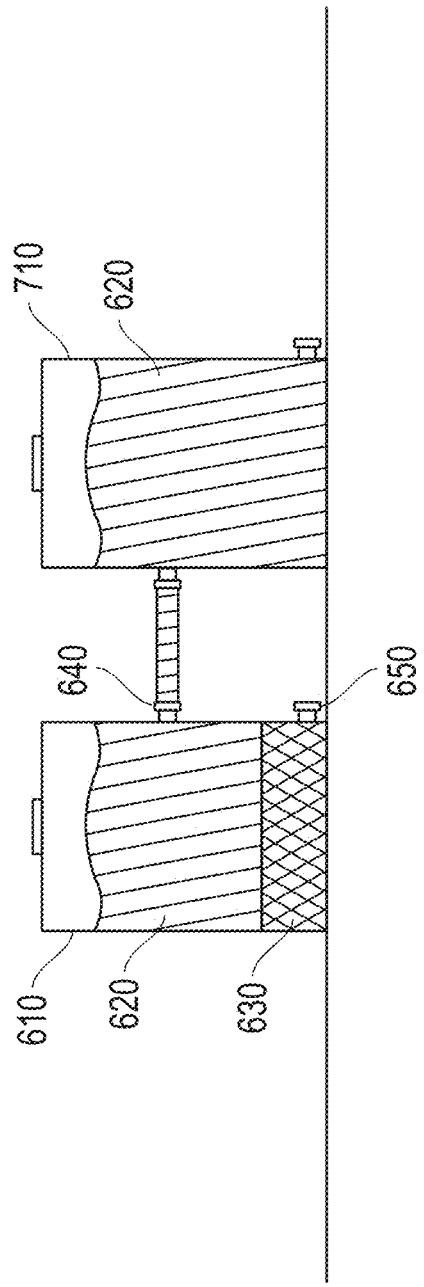
FIG. 6 is a cross-sectional depiction of two vessels receiving filtered water from the sump beneath the disposal cell of the present invention.

The collector tubes 520 are attached to a sump 530 and filtered water from the sump 530 is pumped, or otherwise transported, into at least two interconnected storage vessels 610 and 710 as shown in FIG. 6. Once the filtered water enters the first storage vessel 610, any oil 620 remaining in the mixture will again separate from the water 630 and rise to the top of the first vessel 610. The first vessel 610 is connected to a second vessel 710 at a height sufficient to allow the oil 620, but not the water 630, to flow to the second vessel 710. The oil 620 can then be taken from the second vessel 710 and sold or used for its intended purpose. The water 630 can be drained from the first vessel 610 through a port 650 below the level of the oil 620.

Figure 7:
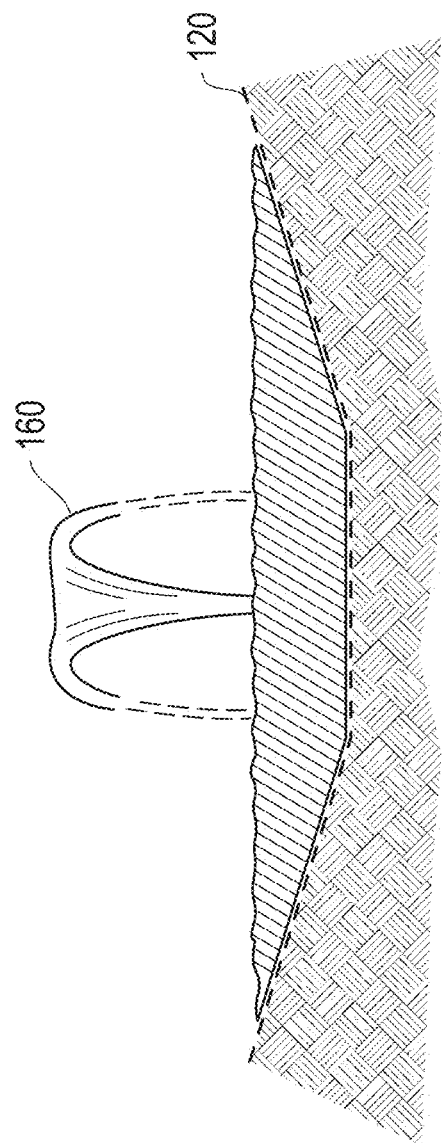
FIG. 7 is a depiction of an evaporator used in one embodiment of the present invention.

It should be noted that, as shown in FIG. 7, in some embodiments it may be preferable to facilitate the evaporation in the disposal cell 120 by aerating the water 160.

The system described herein is comfortably able to treat forty five cubic meters (approximately 120,000 gallons) of wastewater per day. For example, when fifteen daily shipments of thirty cubic meters (approximately 8,000 gallons) of oil water mixture are deposited into the cell, the hydraulic loading remains below 0.045 m3/(m2*day) (approximately 1.10 gal./sq ft*day).

While the present system and method has been disclosed according to the preferred embodiment of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for treating wastewater known in the art, the detailed embodiments are intended to be illustrative only and should not be taken as limiting the scope of the invention. Rather, what is claimed as the invention is all such modifications as may come within the spirit and scope of the following claims and equivalents thereto.

None of the description in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

What is claimed is:

1. A method for treating wastewater comprising:
allowing the wastewater to separate in a disposal cell into a hydrocarbon fraction and a water fraction:
skimming a hydrocarbon fraction from the top of the disposal cell;
allowing the water fraction to seep through a geotextile composite into collection tubes located beneath the disposal cell;
pumping the water fraction from the collection tubes to a first vessel;
allowing the water fraction to separate in the first vessel into a second hydrocarbon fraction and a second water fraction;
removing the second hydrocarbon fraction to a second vessel.

2. The method of claim 1, wherein the geotextile composite allows water to pass through but filters dirt.

3. The method of claim 1, wherein a layer of soil is located on top of, and in contact with, the geotextile composite.

4. The method of claim 1, wherein a liner material is located underneath, and in contact with, the geotextile composite material, the liner material having openings or conduits through which water may pass to the collection tubes.

5. The method of claim 1, wherein a liner material and a sealing layer are located underneath, and in contact with, the liner material, the liner material and sealing material having openings or conduits through which water may pass to the collection tubes.

6. The method of claim 1, wherein a layer of soil is located on top of, and in contact with, the geotextile composite, a liner material is located underneath, and in contact with, the geotextile composite material, and a sealing layer is located underneath, and in contact with, the liner material, the liner material and sealing material having openings or conduits through which water may pass to the collection tubes.

* * * * *